United States Patent [19]

Webb et al.

[11] Patent Number: 5,285,293
[45] Date of Patent: Feb. 8, 1994

[54] METHOD AND APPARATUS FOR PROVIDING SENSOR COMPENSATION

[75] Inventors: Steven L. Webb; Edward S. Beeman, both of Loveland; Kenneth D. Gennetten, Fort Collins, all of Colo.; Craig L. Miller, Boise, Id.

[73] Assignee: Hewlett-Packard Company, Palo Alto, Calif.

[21] Appl. No.: 946,256

[22] Filed: Sep. 16, 1992

Related U.S. Application Data

[63] Continuation of Ser. No. 470,292, Jan. 25, 1990, abandoned.

[51] Int. Cl.[5] .............................................. H04N 1/40
[52] U.S. Cl. .................................... 358/471; 358/445; 358/406; 348/251
[58] Field of Search .................... 358/213.15, 213.16, 358/445, 460, 461, 464, 471, 406

[56] References Cited

U.S. PATENT DOCUMENTS

| | | | |
|---|---|---|---|
| 4,045,816 | 7/1977 | Cave | 358/213.15 |
| 4,216,503 | 7/1980 | Wiggins | 358/468 |
| 4,554,583 | 11/1985 | Saitoh et al. | 358/461 |
| 4,578,711 | 3/1986 | White et al. | 358/464 |
| 4,602,291 | 7/1986 | Temes | 358/213.16 |
| 4,723,174 | 2/1988 | Nishikawa et al. | 358/461 |
| 4,839,729 | 6/1989 | Ando et al. | 358/213.16 |
| 4,907,097 | 3/1990 | Sobue | 358/461 |
| 4,916,549 | 4/1990 | Sekizawa | 358/461 |
| 4,920,428 | 4/1990 | Lin et al. | 358/461 |
| 4,989,100 | 1/1991 | Ishima | 358/475 |
| 5,124,810 | 6/1992 | Seto | 358/406 |
| 5,130,788 | 7/1992 | Hirota | 358/461 |
| 5,130,822 | 7/1992 | Nagata | 358/461 |
| 5,132,801 | 7/1992 | Yamano | 358/213.16 |
| 5,204,761 | 4/1993 | Gusmano | 358/406 |

FOREIGN PATENT DOCUMENTS 0336410 10/1989 European Pat. Off. .
WO90/04899 5/1990 PCT Int'l Appl. .

Primary Examiner—Edward L. Coles, Sr.
Assistant Examiner—Thomas L. Stoll

[57] ABSTRACT

A document scanner provides compensation for sensitivity nonuniformity that may exist between the individual sensor cells of the sensor array that is used to sense light reflected from a document being scanned. Compensated is provided for both dark (i.e. unilluminated) sensitivity variation and light (i.e. illuminated) sensitivity variation that may exist in the individual sensor cells of the sensor array.

9 Claims, 5 Drawing Sheets

METHOD AND APPARATUS FOR PROVIDING SENSOR COMPENSATION

CROSS REFERENCE to RELATED APPLICATION

This is a continuation of copending application Ser. No. 07/470,292 filed on Jan. 25, 1990, now abandoned.

RELATED APPLICATION

Copending application Ser. No. 07/470,291, entitled "Method and Apparatus for Providing Illumination Compensation in a Document Scanner", filed of even date herewith, is incorporated herein by reference.

1. Field of the Invention

This invention relates to the field of document scanning, and more specifically to a method and an apparatus that compensates for sensitivity nonuniformity that may exist between the individual sensor cells of a sensor array that is used to sense the light that is reflected from a document.

2. Background of the Invention

The technology of document scanning relates to method and apparatus whereby the visible image(s) carried by a document is converted to an electronic signal, for use by a variety of electronic processing means.

In accordance with well known techniques, the scanning of a document operates to divide the document into an X-Y matrix comprising a large number of individual picture elements (PEL or PELS) equal in number to X times Y. For each document PEL, an electronic signal is generated by the scanner apparatus.

The document's visual image is converted into a digital image signal by the scanning process. This digital image signal can be used in many ways. For example, the image signal can be transmitted to remote locations for storage or for reproduction by a printer, or the image signal can be manipulated in a manner to enhance or change the image, or the image can be merged with other images.

The light reflected from a document enters an optical means, and is thus focused onto a light sensitive array, for example a charge coupled device (CCD) array. This array then generates individual analog voltages whose magnitudes are proportional to the light that is reflected from the individual PEL areas of the document. These analog voltages are then converted to digital signals.

Very simplistically, if a portion of the document's black image (assuming a black image on white paper background) is detected within a document PEL, the binary signal "1" can be generated, in which case, the absence of a portion of the document's black image at a PEL location (i.e. the PEL contains the white document background) would result in a binary "0" being generated.

Usually, however, the scanner signal that is generated for each document PEL is a multi-bit digital signal. This is desirable since a multi-bit signal allows the sensing of different levels of blackness within each PEL area of the document (i.e. grey scale PEL information can be provided). Thus, a 4-bit signal per PEL allows 16 different color-shades of document image (i.e. white, 14 different shades of grey, and black) to be generated for each document PEL. The range of values of such a 4-bit signal would vary from a low value of hexadecimal "0", to a high value of "F". When an 8-bit per PEL signal is generated, the 256 different signals represent 256 different color-shades of document image for each document PEL. The range of values of such an 8-bit signal would vary from a low value of "00" to a high value of "FF".

The present invention will be described in relation to a document scanner that provides an 8-bit signal for each document PEL. The scan word "00" will represent a white PEL. The scan word "FF" will represent a dense black PEL, and intermediate value words will represent shades of grey PELS. However, as those skilled in the art will readily appreciate, the invention is of general scanner utility and is not to be limited to this specific multi-bit scan signal format.

Document scanners are conventionally provided with a generally horizontal, flat, glass platen on whose upper surface a document is placed, image side facing down, for scanning. The document can then be scanned by moving a line of light, or a linear zone or footprint of light, relative thereto, or alternatively the document can be scanned by moving the document relative to a stationary line of light. The present invention will be describe with reference to a stationary-document/moving-light document scanner. However it is to be understood that the invention is not to be limited to this particular type of scanner.

The convention used in the following description considers the direction in which the line of light extends in the X direction. This is the same direction in which the document PEL scan rows or scan lines extend. The orthogonal scan direction in the Y direction. This is the direction in which the document PEL columns extend.

Each incremental scan position of the line of light footprint relative to the document will be defined as a document row. While the scan operation usually comprises continuous motion, within the invention it need not be so, and in any event, the sequential reading out of the sensor array has the effect of converting the document into discrete rows. As will be appreciated, the position of each document column is determined by the physical location of the individual sensor cells within the sensor array. Each sensor cell generates a document PEL column as a result of the scanning of a document.

The problems created in document scanners by sensitivity nonuniformity among the individual sensor cells of the sensor array is recognized in the prior art. While various means such as careful manufacturing procedures and the selection of sensor cell chips having similar characteristics has minimized this problem to some extent, the need still exists for a construction and arrangement that will compensate the array in a dynamic manner, such as at the beginning of each and every document scan.

SUMMARY OF THE INVENTION

The present invention provides a method and an apparatus for compensation for photo response nonuniformity that may exist between the individual sensor cells of a sensor array, so that subsequently, when a document is scanned, all sensor cells will provide an output effect that is substantially the same when the cells are subjected to the same magnitude of light from the document. As a result of operation of the invention, light path variations in the X or row direction are also compensated. Examples of such light path variations include lamp or light source variation, contamination of mirrors and the like, lens variation, etc.

While the invention will be described relative to a document scanner wherein light is reflected from the document during a scan thereof, the scope and spirit of the invention is not to be limited thereto. For example, the invention also finds utility where light is transmitted through the document during a scan.

An object of the invention is to provide a document scanner having a light sensitive array comprising a plurality of individual sensor cells, the array being arranged for movement relative to a document to thereby scan the document as the document is illuminated. As a result, the individual sensor cells provide output signals in response to light received from the document during the scan. Compensation for sensitivity nonuniformity that may exist between the individual cells is accomplished by the combination of (1) signal processing means that is associated with the individual cells of the array to process the output signals provided thereby, (2) document-replicating target means positioned relative to the sensor array to be illuminated as the document is illuminated, (3) means for determining the dark response of the cells when the target is not illuminated, and providing a dark response compensation signal as a result thereof,(4) means for determining the light response of the cells when the target is illuminated, and providing a light response compensation signal as a result thereof, and (5) means responsive to the dark response compensation signal and to the light response compensation signal to adjust the sensitivity of the signal processing means in a manner to compensate for any variation in the dark response and/or in the light response of the individual cells. In a preferred embodiment of the invention the target is of a continuously uniform color tone, for example a known tone of white.

The exact color tone or reflectance characteristic of the target portion that is utilized in accordance with the invention to provide sensor compensation of the document scanner is not critical to the invention, and this parameter can be varied by those skilled in the art within the spirit and scope of the invention. In a preferred embodiment of the invention, but without limitation thereto, it was found desirable to provide a known white color tone (i.e. humanly perceived as white or a shade of white) for the target, such that when the target was not illuminated by the scanner's light source, the target provided substantially no light reflection to the sensor, and when the target was illuminated by the light source, the target provided a percent of light reflection that was somewhat less (for example about 90%) than the reflection that would be expected from the most reflective area of a typical document being scanned.

As features of the invention, dark/light response compensation occurs periodically, and only as needed, but may occur prior to substantially every document scan; a platen is provided to support a document with a leading edge thereof at a home position for scanning, and the target is positioned adjacent this home position such that the initial portion of a document scan enables determination of the dark/light response; a portion of the target is scanned while the same is not illuminated in order to determine the dark response and a portion of the target is scanned while the same is illuminated in order to determine the light response; and a document is scanned after a compensation word is calculated and then stored for any variation in the dark response and/or in the light response of the individual sensor cells.

A preferred embodiment of the invention provides a compensation RAM in which dark/light sensitivity compensation words are stored. As the document PELS are read, the analog signal received from each document PEL is applied to the signal input of an analog to digital (A/D) convertor. This A/D convertor includes two control inputs. As the analog signal for a given cell is applied to the signal input of the A/D, the compensation word for that cell is fetched from RAM, and the dark/light compensation word is applied to the two reference inputs of the A/D. Each compensation word is calculated based upon (1) the dark signal of each cell as the cell views a target area adjacent the document's leading edge in the absence of light, and (2) the light signal of each cell as the cell thereafter views an illuminated target area adjacent the document's leading edge. Thereafter, document scanning begins.

These and other objects and advantages of the invention will be apparent to those skilled in the art upon reference to the following detailed description wherein reference is made to the drawing.

DETAILED DESCRIPTION OF THE INVENTION

Figure 1:
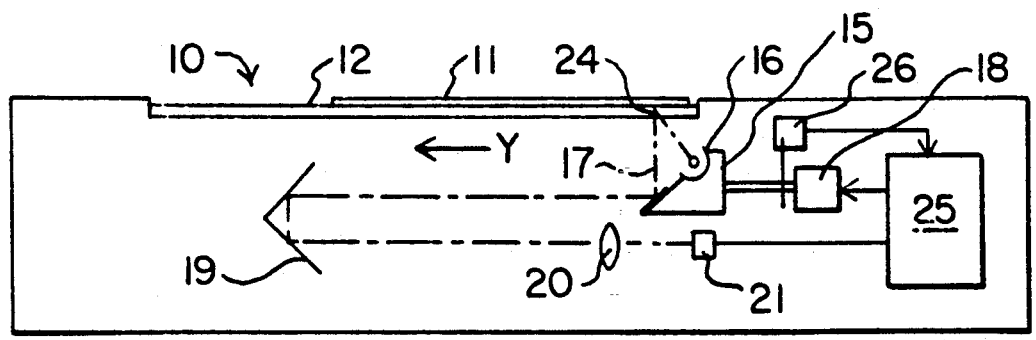
FIG. 1 is a showing of a moving light source document scanner that includes the present invention.
Figure 2:
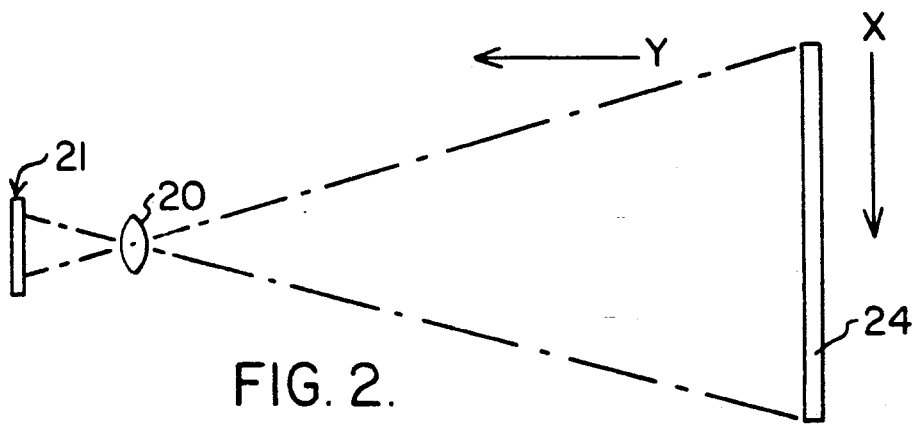
FIG. 2 shows the object-plane/image-plane optical path of the FIG. 1 scanner in its unfolded state.
Figure 3:
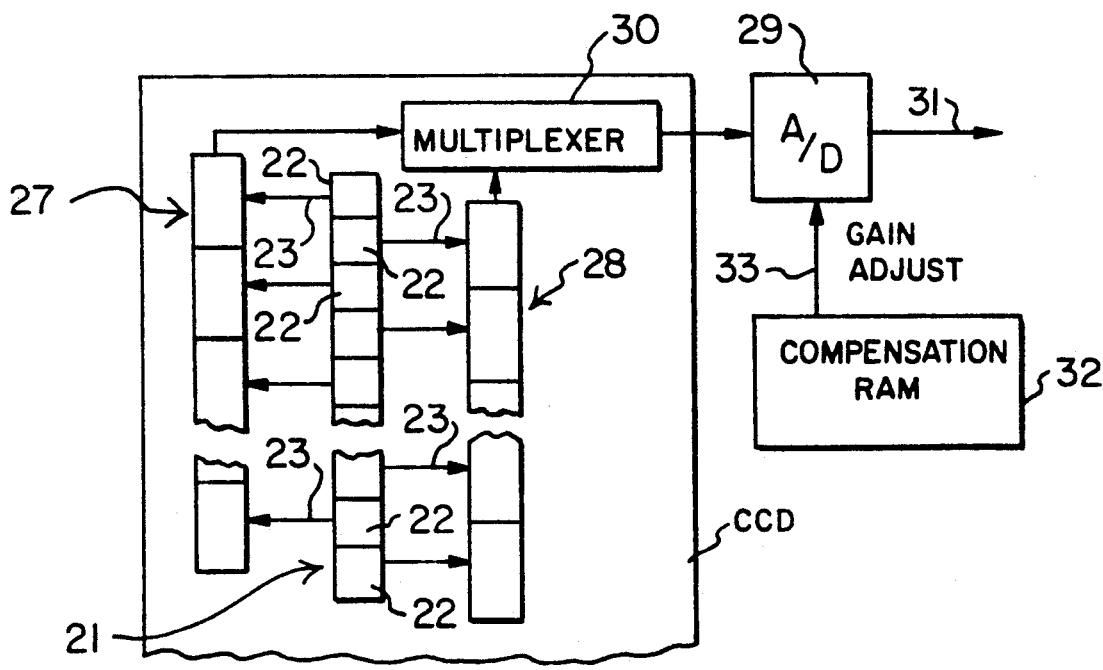
FIG. 3 shows the manner in which the analog output signals of the individual sensor cells of FIG. 1 are converted to digital signals, and shows the manner in which this signal is compensated for using the stored dark/light sensitivity characteristics of the cells.

A stationary document, moving light source, document scanner apparatus 10 embodying the invention is shown in FIGS. 1-3. This scanner is of the general type in which the present invention finds utility. However, the invention is not to be limited thereto.

In scanner 10, document 11 is positioned on transparent platen 12 with its visual image facing downward. The image is then scanned, so as to convert the visual image contained thereon into an electronic signal image form that is useable by data processing machines and the like.

The scanning process, whose details are not critical to the invention, is accomplished by a movable carriage 15 that contains a light source 16 and a reflecting mirror 17. Motor 18 is mechanically coupled to carriage 15, as by gears, cables or the like, to move carriage 15 in the Y direction, along the length of platen 12. The light reflected from the document is redirected by movable corner mirror 19 into lens 20 and thence into sensor array 21. As is well known in the art, mirror 19 is mounted for movement concurrently with carriage 15, but at one half the velocity of carriage 15, so that the optical path from the object plane of scan line of light 24 to the image plane of sensor array 21 is maintained constant in length.

Sensor array 21, without limitation thereto, is preferably a charge coupled device (CCD) that is configured as a linear serial array of discrete light sensor cells or light detector cells 22. Each sensor cell 22 of sensor array 21 defines a document picture element (PEL). For instance, CCD's which can distinguish 400 PEL cells per inch on the document provide good quality resolution, and are readily available from contemporary commercial sources.

Light source 16 is constructed and arranged, in a manner well known to those of skill in the art, to produce a line of light 24, or a linear footprint or zone of light, on platen 12. Line of light 24 extends in the X direction relative to document 11. The line of light 24 defines a row of document PELS. As line 24 moves, i.e. as the document is scanned and line of light 24 moves in the Y direction in FIG. 4, the document is broken down into a number of parallel rows, each row being a large number of document PELS in length.

In FIG. 2, a typical 8.5 inch long image scan line 24 (also note numeral 24 in FIG. 1) is optically reduced in length as it passes through lens 20 in a ratio of, for example, about 7.7:1 before reaching CCD sensor array 21. Note that linear sensor array 21 also effectively extends in the above defined X direction relative to document 11.

The analog electrical signal content 23 of sensor array 21 is periodically read out, document row by document row, as carriage 15 moves in the Y direction relative to document 11 on platen 12. The analog output scan signals 23 from the individual cells of sensor array 21 are coupled to electronic controller 25 (FIG. 1), where the signals are converted to digital signals, as will be described. Controller 25 introduces drive signals to motor 18, and may also receive position or movement feedback information relative to carriage 15 and/or mirror 19, such as from the output of a tachometer position detector 26 and from a carriage home position sensor (not shown).

FIG. 3 illustrates an arrangement for reading out the analog signal content 23 of sensor array 21. By means of gating signals (not shown), the analog signal content of every other sensor cell 22 of sensor array 21 is coupled in parallel into analog shift register 27, while the analog signals present in the other intervening sensor cells 22 are coupled in parallel into analog shift register 28. That is, in this embodiment of the invention, but without limitation thereto, the contents of the odd numbered cells of sensor array 21 are periodically transferred to shift register 27, whereas the even numbered cells have their contents transferred to shift register 28 at the same periodic time.

The analog signals 23 that are loaded into shift registers 27 and 28 have magnitudes that are representative of the various light levels that are reflected from the individual PELS of document 11 for that document row. The magnitude of these analog signals corresponds to the average of the light that is reflected from a small incremental PEL of document 11 over a predetermined period of time.

Subsequent to transfer into registers 27 and 28, analog signals 23 are shifted serially into analog to digital converter (A/D) 29 by way of multiplexer 30. The digital output 31 of A/D 29 is a sequence of multi-bit digital image data for example one byte of data for each document PEL. Each of those data bytes is encoded so as to correspond digitally to the magnitude of a discrete one of the analog signals 23 that is retrieved from shift registers 27 and 28, and thus each byte corresponds to the magnitude of the reflected light that is present at one of the document PELS. If sensor array 21 images 400 cells or PELS per inch, output 31 of A/D 29 comprises a similar 400 bytes per inch.

The present invention provides a means for controlling the transfer function or gain and offset of A/D 29 as a function of the measured sensitivity of each cell 22 of array 21. More specifically, a calibration RAM 32 contains cell sensitivity information that is connected by line 33 to adjust the gain and offset of A/D 29 corresponding to each cell 22, as that cell's analog signal 23 is presented to A/D 29.

Figure 4:
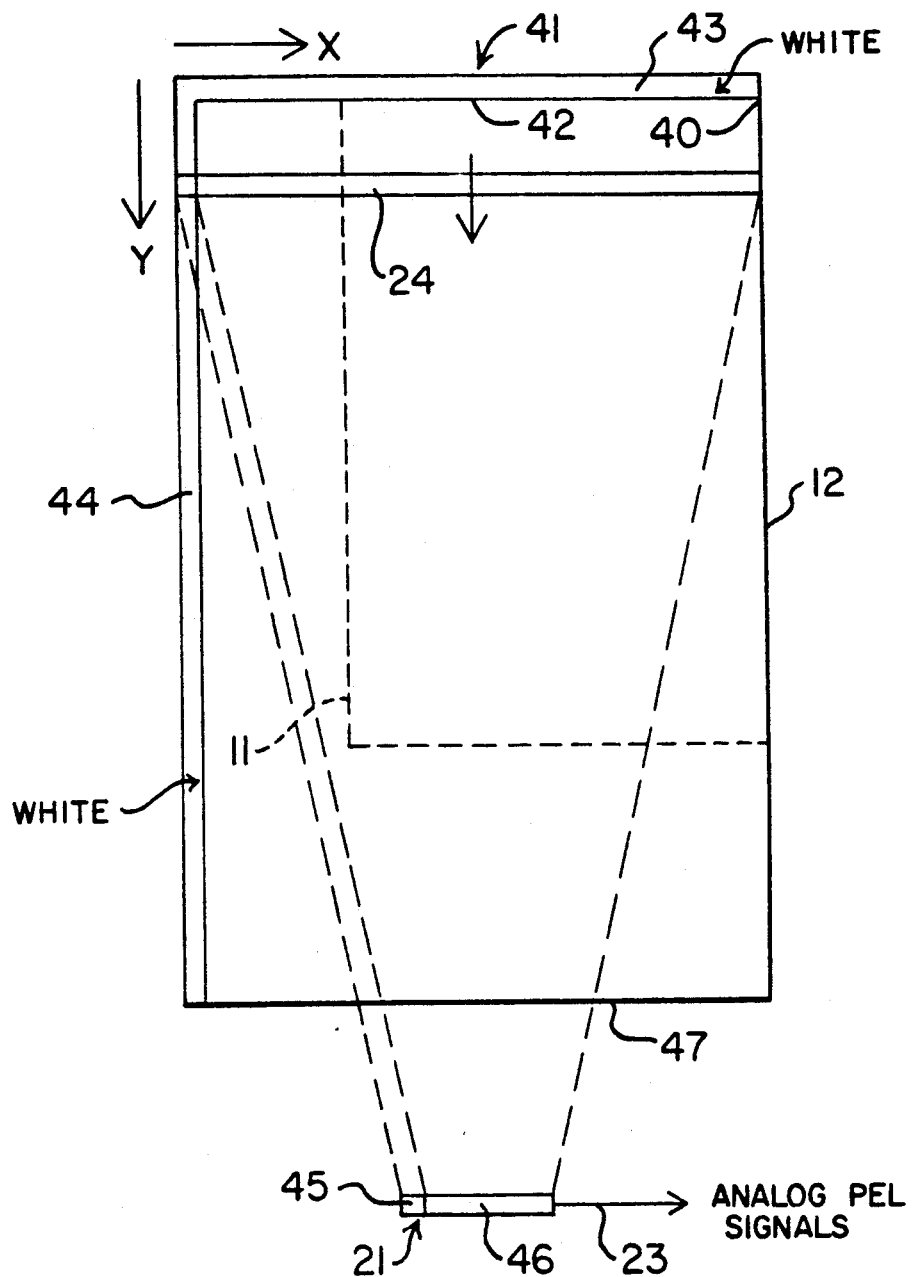
FIG. 4 is a bottom view of the FIG. 1 document platen, showing an exemplary document corner referenced at the upper left hand corner of the platen for scanning (i.e. the left hand corner as viewed from the top of the platen), showing a white X-direction calibration stripe that is located at the home position of the scan line of light, and showing the scan line of light at a position that is spaced from its home position.

With reference to FIG. 4, this figure shows the rectangular, planar shape of platen 12, as seen from the underside thereof. Dotted lines show a typical document 11 supported on the upper surface of the platen, the document being referenced to corner 40 of the platen but without limitation thereto. Sensor array 21, which preferably is a CCD array but without limitation thereto, is shown viewing the platen area defined by moving light footprint 24. Note that for simplicity lens 20 of FIG. 1 and 2 is not shown.

In terms of document scan direction, edge 42 of the platen is the beginning of scan edge or area, and parallel edge 47 is the end of scan edge or area.

In accordance with the invention, a target means 41 is mounted closely adjacent the leading edge 42 of platen 12. Target means 41 and platen edge 42 define the beginning area of document scan, i.e. target means 41 defines the home position of scanning line of light 24. Note that in FIG. 4 a scan operation is underway since line of light 24 is shown as having scanned a small portion of document.

Target means 41 is L-shaped and thus contains two orthogonal portions. Both portions of target 41 are opaque and are colored to simulate the background tone of typical documents to be scanned. For example, since most documents provide a black, or colored, image on a white background, target 41 is preferable white, or essentially white, in color.

Portion 43 of target 41 is the portion of the target of interest relative to the present invention. Portion 43 extends in the X direction, parallel to the platen's leading edge 42, and normal to the Y direction of document scan. As measured in the Y direction, portion 43 is about $\frac{1}{8}$ inch wide. As will be described, in accordance with the present invention target portion 43 is used to provide compensation for differences in dark sensitivity and/or light sensitivity of the individual sensor cells 22 of array 21.

Portion 44 of target 41 is of a similar PEL size to portion 43 (measured in the X direction), and is used to provide compensation for changes in illumination intensity of light source 16, as is described in copending application Ser. No. 07/470,291, entitled Method and Apparatus for Providing Illumination Compensation in a Document Scanner, filed of even date herewith. Prior to operation of the present invention, the nominal setting for the energization of light source 16 may be determined, as is described in this copending application. CCD array 21 contains an relatively short area 45 of a number of sensor cells 22 that are used as is described in the above mentioned application.

Array 21 also contains a relatively longer area 46 of sensor cells 22 which, in accordance with the present invention, are used to first view target area 43, and to then view the active area of platen 12, that is, the area of platen 12 on which the operator has placed a document to be scanned.

As will be apparent, the invention operates to cause array 21 to first view a portion of target 43 while light source 16 is deenergized, in order to perform dark sensitivity compensation of array 21. This procedure is immediately followed by array 21 viewing a portion of target 43 while light source 16 is energized, to thereby perform light sensitivity compensation of array 21. After all individual sensors 22 of array 21 have been compensated during the initial portion of each document scan, the document scan procedure immediately begins as light footprint 24 reaches platen edge 24 while moving in the Y direction of FIG. 4.

Since target 41 is contained within the closed scanner apparatus housing (not shown), the target is in the dark when light source 16 is not active. As a result, the output signal or current from each individual sensor cell 22 is at this time ideally of the same low magnitude, designated the cell's dark signal or current. This condition simulates the condition that will exist during document scanning when an individual sensor cell 22 views a low reflectance image PEL, for example a black image PEL contained on a white background document. Typically, this is lowest level of illumination that a sensor cell will experience during a document scan.

In accordance with a feature of the invention, a dark current compensation signal is computed and stored for each individual sensor cell 22. This signal is later used during a document scan to minimize or eliminate any nonuniformity in dark response or sensitivity that may exist between the individual sensor cells 22 of array 21.

In like manner, since target 41 is contained within the scanning apparatus housing and adjacent platen 12, the target will be illuminated to the same extent as a document is illuminated when source 16 is active. As a result, the output signal or current that is received from each individual sensor cell 22 when array 21 views an illuminated portion of target 41 is designated the cell's light signal. Typically, this is highest level of illumination that a sensor cell will experience during a document scan.

In accordance with a feature of the invention, a light current compensation signal is computed and stored for each individual sensor cell 22. This signal is later used during a document scan to minimize or eliminate any nonuniformity in light response that may exist between the sensor cells 22 of array 21.

Figure 5:
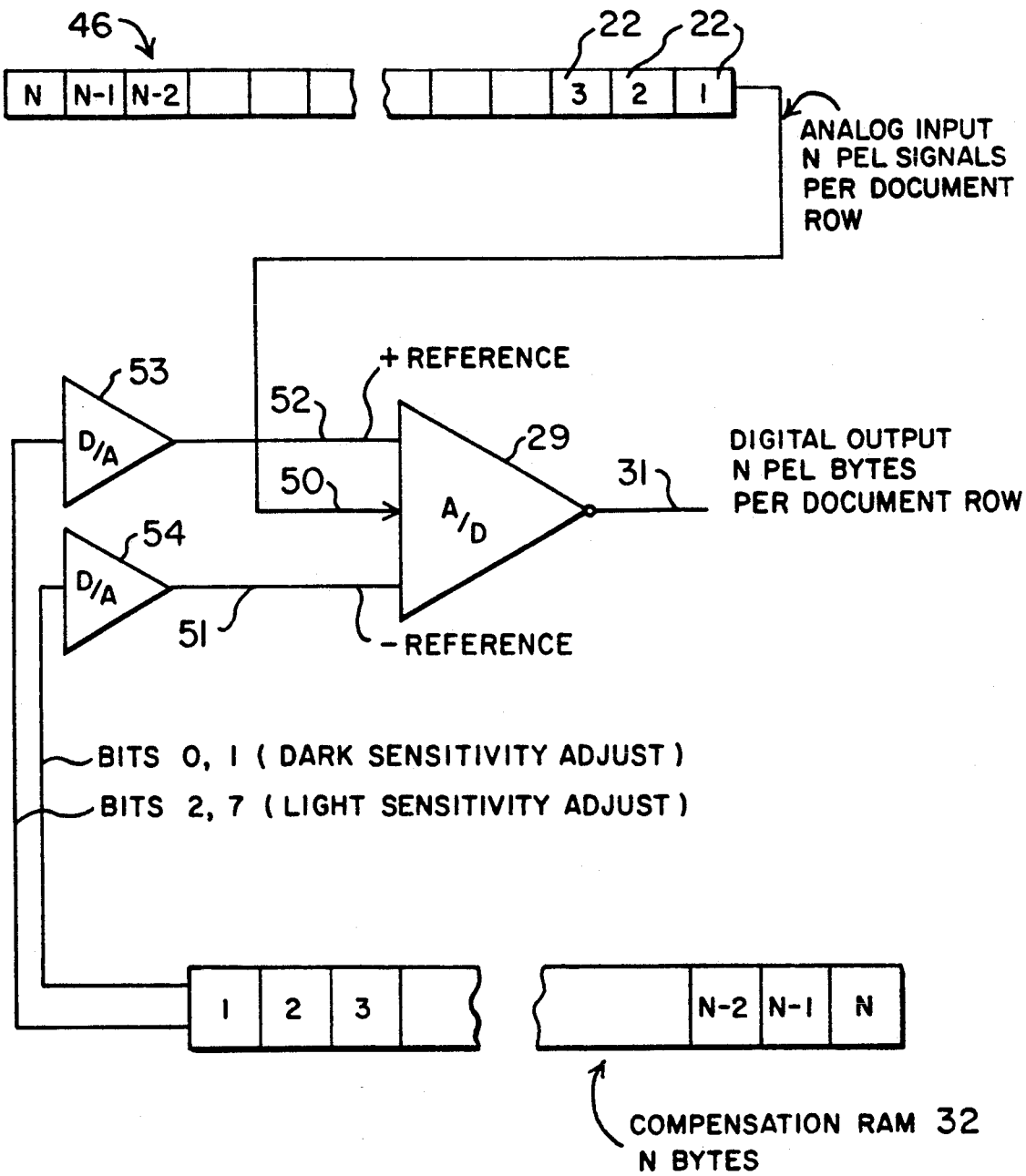
FIG. 5 is a showing similar to FIG. 3 showing in greater detail the manner in which the analog output signal of the sensor cells are compensated for dark/light sensitivity characteristics, in accordance with compensation bytes that are stored in a compensation RAM.

One manner of compensating the individual sensor cells 22 of array 21 in accordance with the invention will be described with reference to FIG. 5. This figure shows the analog to digital convertor 29 of FIG. 2 as having a signal input 50 to which the analog output of array 21 is connected. In FIG. 5, registers 27,28 and multiplexer 30 are not shown for purposes of simplicity. It is to be understood however that the individual analog signal content of each sensor cell in array portion 46 is sequentially applied to input 50 for each and every document row, and in row by row sequence.

For accomplishing compensation as aforementioned, A/D 29 is also provided with control input means comprising a negative or low reference control input 51 and a positive or high reference control input 52.

In this figure, array portion 46 is shown as having sensor cells equal in number to N. Without limitation thereto, N may be equal to 3400 PELS in each document row (i.e., 400 PELS per inch of an 8 ½ inch wide document). For each document row (recalling that a document row extends in the X direction of FIG. 4) array portion 46 provides the number N of PEL analog signals, one for each sensor cell 22, and A/D 29 provides the number N of PEL digital bytes at its output 31, one byte for each document PEL.

For purposes of simplicity, the processing of digital output 31 for use by other systems or devices will not be described herein. However, as will be appreciated by those of skill in the art, many functions such as image contrast/intensity control, image scaling, dithering, thresholding, windowing, and/or packing may be provided, as is desired.

As will be described in greater detail with reference to FIG. 6, compensation RAM or memory 32 contains the number N of compensation bytes, one byte for each of the N cells 22 of array portion 46. Without limitation thereto, the first two bits of each compensation byte (i.e. bits "0" and "1") contain information as to the dark response of its sensor cell 22. The availability of two bits enables four different levels of dark compensation to be stored in RAM 32. For example, and with reference to FIG. 5, assuming that the sensor cell which is numbered "3" in array portion 46 provided essentially no output signal when viewing an unilluminated portion of target 43, as above described, then bits "0" and "1" of the compensation word numbered "3" would both contain a binary "0".

Bits "2" through "7" of each compensation word contain information as to the light sensitivity of its sensor cell. While the invention is not to be limited thereto, this construction and arrangement of the compensation bytes enables more information (i.e. six bits) to be stored relative to each sensor cell's light sensitivity than is stored relative to its dark sensitivity. As will be apparent from FIG. 6, the higher the signal magnitude that is generated by a sensor cell 22 when all cells view the same amount of light reflected from a portion of target 43 that is illuminated by light source 16, the higher will be the binary value that is stored within bits "2" through "7" of that cell's compensation word.

In order to provide sensor cell compensation, the binary value contained within bits "0" and "1" of a compensation word in RAM 32 are connected to control input 52 of A/D 29 by way of D/A 53, and the binary value contained within bits "2" through "7" of this same compensation word are connected to control input 51 by way of D/A 54. In this way, A/D 29 is controlled to provide the same digital output value at output 31 for the same amount of light reflected from different document PELS to different sensor cells 22, independent of variation in the dark response and/or the light response of the individual N number sensor cells within array portion 46.

More specifically, the transfer function of A/D 29 is controlled as a function of the analog output values of D/As 53,54.

Figure 6:
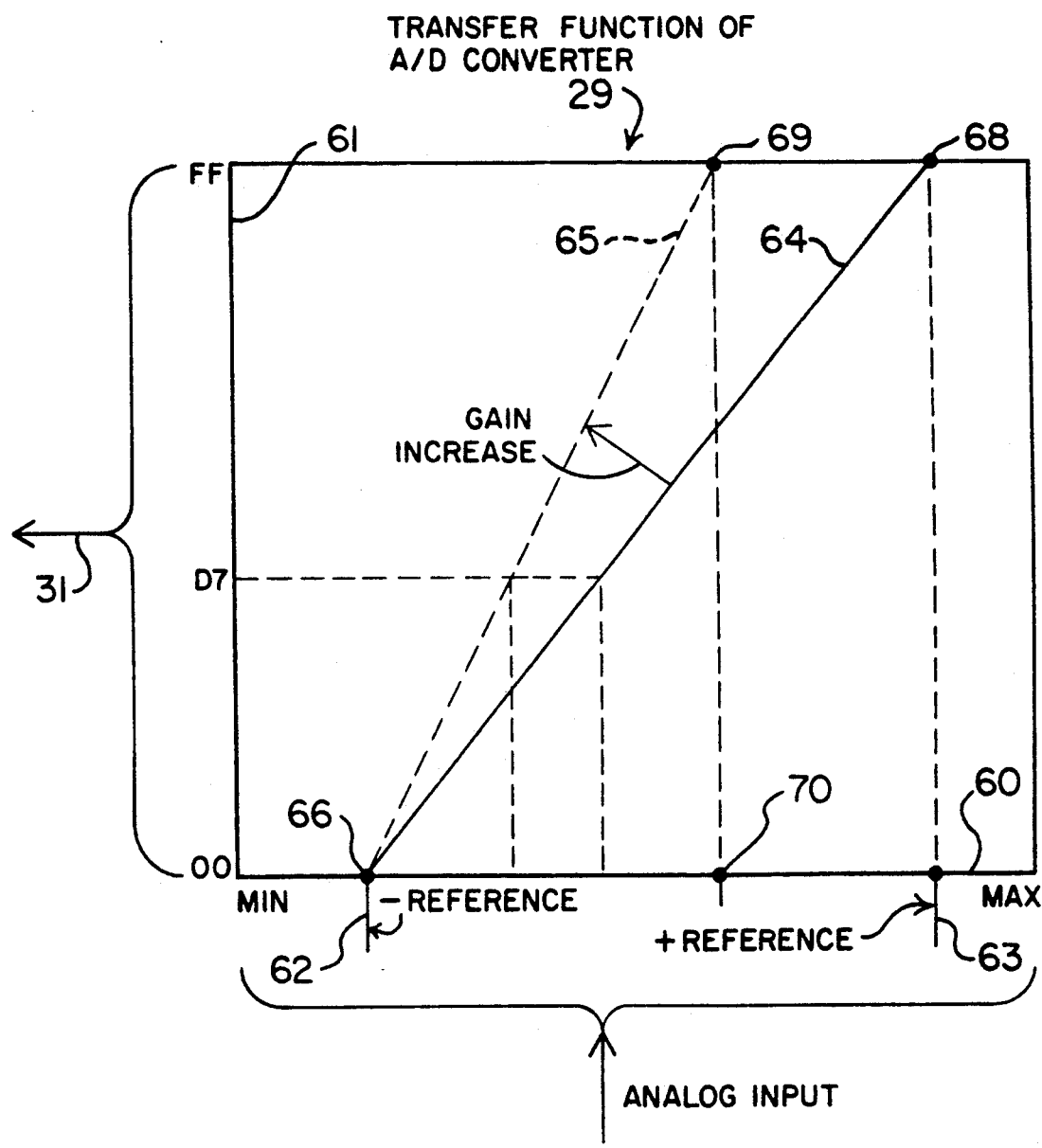
FIG. 6 shows the transfer function of the A/D convertor of FIGS. 3 and 5, and shows how this transfer function changes as a function of the content of a cell's compensation byte contained in the compensation RAM of FIGS. 3 and 5.

With reference to FIG. 6, X axis 60 represents the analog input of A/D 29, this being input 50 of FIG. 5. The Y axis of FIG. 6 represents the digital output of A/D 29, this being signal 31 of FIG. 5. The two control inputs 51 and 52 of FIG. 5 are represented by the reference numerals 62 and 63, respectively, of FIG. 6.

Two representative input/output transfer function lines 64 and 65 are shown in FIG. 6. These two function lines represent the control of A/D 29 by two different compensation bytes from RAM 32, for two different sensor cells 22. Note that in this example, both of these exemplary sensor cells have the same dark response, and thus both compensation words (i.e. bits "0" and "1" of each compensation word) produce the same negative reference 51 control effect on A/D 29. Since this is true, the two transfer function lines 64,65 have a common low magnitude analog signal point 66 corresponding to a hexadecimal output of "00".

Assuming also that the digital output 31 of A/D 29 is one byte for each document PEL, when these two sensor cells are subjected to a minimum of light reflected from their respective document PELS, for example the reflection from a black image, the output of A/D 29 will be hexadecimal "00".

These two representative sensor cells 22 do not, however, have the same light sensitivity. Note that the cell 22 that corresponds to function line 64 is more sensitive to light than is the cell 22 corresponding to function line 65. As a result, bits "2" through "7" of the compensation byte corresponding to function line 64 is of the higher magnitude, and this higher magnitude, when applied to control input 52 of FIG. 5, establishes a "+reference" control point 68 for function line 64. The less sensitive cell 22 has a "+reference" control point 69.

As can be seen from FIG. 6, the range of analog signal values that can be expected at the input 50 of A/D 29 from the more sensitive of these two cells 22 cover the analog signal range from 62 to 63 on the X axis, whereas the range of analog values that can be expected from the less sensitive of these two cells 22 covers the smaller analog signal range from 62 to 70 on the X axis. Note however that these two different analog signal ranges provide the same digital output (i.e. "00" to "FF") from A/D 29.

Thus, in accordance with the invention, compensation is provided for the differences in dark and/or light sensitivity of the sensor cells 22 of array 21.

Figure 7:
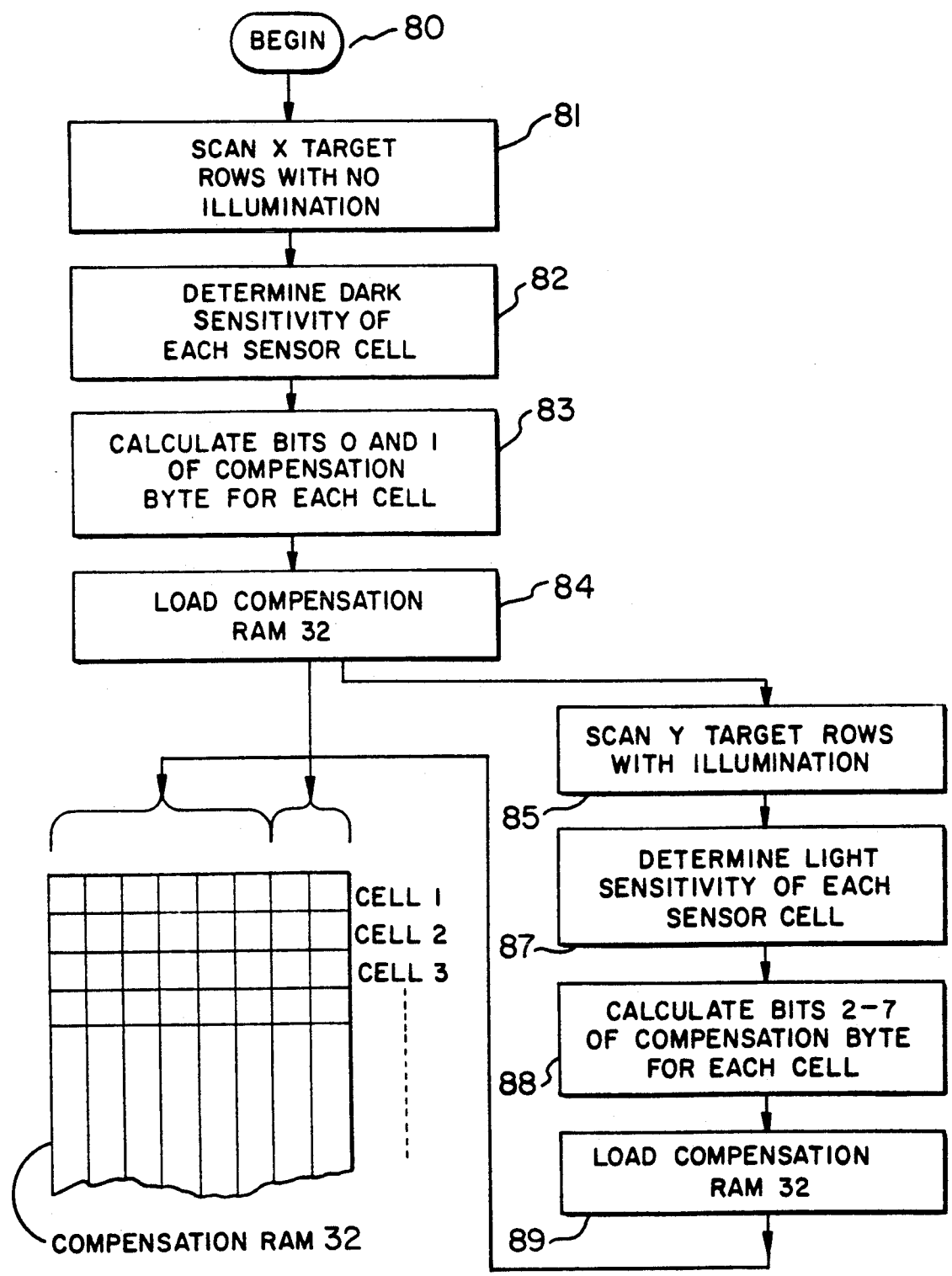
FIG. 7 shows the manner in which bits "0" and "1" of each compensation byte are calculated as a function of a cell's dark response, and the manner in which bits "2" through "7" of each compensation byte are calculated as a function of a cell's light response.

While those skilled in the art will readily visualize a number of ways in which compensation RAM 32 may be loaded with dark/light sensitivity compensation words for each of the sensor cells 22 of array 21, FIG. 7 is provided as an exemplary teaching, without limitation thereto.

In this figure, compensation RAM 32 is shown as having a stack of addressable locations, conveniently labelled "cell 1", "cell 2", etc, to indicate that the compensation word that is stored at the address corresponds to cell 1, cell 2, etc, of array 21.

The description of this figure will begin at event 80, i.e. the beginning of a scan operation. In so far as this invention is concerned, the first step is to scan a first portion of target 43 (FIG. 4) with light source 16 (FIG. 1) deenergized, see event 81 of FIG. 7. At this time all sensor cells 22 are in the dark. No more than one target PEL row need be scanned in this condition. However, it may be convenient to scan a number of rows and to then average each cell's dark output current.

The analog signals provided by each of the sensor cells 22 during event 81 are now analyzed by function blocks 82 and 83, and bits "0" and "1" are loaded into RAM 32, see function block 84. That is, the analog signal magnitudes are sequentially identified, from cell "1" to cell "N", as belonging to one of the four possible states of bits "0" and "1" of a compensation word, i.e. states "00", "01", "10" and "11".

Turning now to event 85 of FIG. 7, after event 81 a number of the PEL rows of target portion 43 are scanned with light source 16 energized. It is desirable, but not essential, that more than one PEL row of target 43 be scanned, and that the resulting signal magnitudes of each sensor cell 22 be averaged or the like, using techniques well known to those of skill in the art, so as to provide but one light sensitivity signal magnitude for each of the cells of array 21, see function block 87 of FIG. 7.

Function blocks 88 and 89 now operate to calculate the binary content of bits "2" through "7" of a compensation word, and to then load RAM 32. Since six bits are available to carry this information, 64 different levels of light sensitivity can be identified, ranging from "000000" to "111111".

The above detailed description of the invention has made reference to embodiments of the invention. However, since it is apparent that those skilled in the art will readily visualize other embodiments of the invention in accordance with the teachings hereof, it is intended that the spirit and scope of the invention be limited solely by the following claims.

We claim:

1. Document scanner apparatus comprising, platen means for supporting a document to be scanned, light source means for illuminating a document on said platen means, light sensitive array means, associated with said platen means and arranged for movement relative to a document, for receiving light from a document being scanned, said array means comprising a plurality of individual sensor cells, each of which provides an analog output signal in response to light received from a document during a scan thereof, target means, positioned relative to said sensor array means so as to be illuminated by said light source means, for providing a surface of substantially uniform reflectivity, first means for determining the dark response analog output signal of each of said sensor cells when said array means views said target means in a nonilluminated state, and for providing a dark response digital output signal for each sensor cell as a result thereof, said first means including means responsive to said dark response analog output signal for calculating said dark response digital output signal as first compensation data bits for each of said sensor cells, said first compensation data bits being representative of said dark response analog output signal, second means for determining the light response analog output signal of each of said sensor cells when said array means views said target means in an illuminated state, and for providing a light response digital output signal as a result thereof, said second means including means responsive to said light response analog output signal for calculating said light response digital output signal as second compensation data bits for each of said sensor cells, said second compensation data bits being representative of said light response analog output signal, data storage means, comprising a random access memory (RAM), means for supplying said first and second compensation bits to said data storage means to thereby store a compensation word for each of said sensor cells, and signal processing means, comprising:

(a) analog to digital convertor means comprising control input means for receiving from said data storage means compensation words corresponding to each of said sensor cells and signal input means for receiving analog output signals from said sensor cells, said control input means comprising negative and positive reference terminals respectively coupled to outputs of first and second digital to analog (D/A) convertors, said first and second D/A convertors arranged in parallel to receive said first and second compensation bits representative of said dark and light responses and output to said negative and positive reference terminals analog versions thereof; and (b) means for controlling a transfer function of said analog to digital convertor means in accordance with said analog versions of said compensation bits such that: (i) in response to receiving via said signal input means an analog signal substantially equal in value to or less than said dark response, said analog to digital convertor means will output a digital signal of a first prescribed value, (ii) in response to receiving via said signal input means an analog signal substantially equal in value to or greater than said light response, said analog to digital convertor means will output a digital signal of a second prescribed value, and (iii) in response to receiving via said signal input means an analog signal having a value between said dark and light responses, said analog to digital convertor means will output a digital signal of a value between said first and second prescribed values.

2. The apparatus of claim 1, wherein said platen means is constructed and arranged to support an edge of a document at home position for scanning, and wherein said target means is positioned adjacent said home position.

3. The apparatus of claim 2, comprising means for scanning a first portion of said target means while the same is not illuminated in order to determine said dark response, and means for scanning a second portion of said target means while the same is illuminated in order to determine said light response.

4. The apparatus of claim 3, comprising means for scanning said first portion of said target means prior to the scanning of the second portion of said target means, to thereby provide said dark response signal prior to providing said light response signal.

5. The apparatus of claim 4, wherein scanning of said second portion of said target means while illuminated is substantially immediately followed by scanning a document while the document is illuminated by continuing illumination of the document substantially immediately after determining said light response signal.

6. A method for compensating for any sensitivity nonuniformity that may exist between the individual sensor cells of a document scanner having a light sensitive array comprising a plurality of individual sensor cells, comprising the steps of:

determining the dark response of each of said sensor cells by sensing the output signals of said individual sensor cells as said array views a target when said target is not illuminated, and providing a dark response signal for each individual sensor cell as a result thereof;

determining the light response of each of said sensor cells by sensing the output signals of said individual sensor cells as said array views said target when said target is illuminated, and providing a light response signal as a result thereof;

said steps of determining the dark response and the light response of said sensor cells including the steps of calculating individual compensation data words for each of said sensor cells, each such compensation word having first bits thereof that are representative of said dark response and having second bits thereof that are representative of said light response, and storing said compensation words for use during scanning of a document; and scanning a document so as to generate analog signals indicative of the light sensed by said sensor cells and sequentially feeding said analog signals along with corresponding compensation words to an analog to digital convertor, and controlling a transfer function of said analog to digital convertor such that: (i) in response to receiving an analog signal substantially equal in value to or less than said dark response, said analog to digital convertor will output a digital signal of a first prescribed value, (ii) in response to receiving an analog signal substantially equal in value to or greater than said light response, said analog to digital convertor will output a digital signal of a second prescribed value, and (iii) in response to receiving an analog signal having a value between said dark and light responses, said analog to digital convertor will output a digital signal of a value between said first and second prescribed values.

7. The method of claim 6, including the step of determining said dark response and said light response prior to substantially every document scan.

8. The method of claim 7, including the steps of beginning scanning of said target with said target unilluminated in order to determine said dark response, and scanning a portion of said target with said target illuminated in order to determine said light response.

9. The method of claim 8, wherein said target is generally white in color, such that said dark response is representative of the lowest magnitude light expected to be received from said document during scanning thereof, and such that said light response is representative of a known high magnitude light.

* * * * *